United States Patent [19]

Lang

[11] 4,112,917
[45] Sep. 12, 1978

[54] SOLAR-RAY HEATING APPARATUS

[76] Inventor: Roger Lang, 16, chemin de Roilbot, Chambesy, Geneva, Switzerland, CH-1292

[21] Appl. No.: 762,276

[22] Filed: Jan. 25, 1977

[30] Foreign Application Priority Data

Jan. 29, 1976 [CH] Switzerland ................. 1105/76

[51] Int. Cl.² ................................. F24J 3/02
[52] U.S. Cl. ............................. 126/270; 350/296
[58] Field of Search ........... 350/296; 343/761, 839; 126/270, 271

[56] References Cited

U.S. PATENT DOCUMENTS

| 277,884 | 5/1883 | Clark | 126/270 |
| 2,798,478 | 7/1957 | Tarcici | 126/270 |
| 3,643,648 | 2/1972 | Tarcici | 126/270 |
| 3,797,476 | 3/1974 | Tarcici | 126/270 |

*Primary Examiner*—Carroll B. Dority, Jr.
*Attorney, Agent, or Firm*—Emory L. Groff, Jr.

[57] ABSTRACT

The concave reflector of a solar-ray heating apparatus is supported on a vertical post by an arcuate rod fixed to the center of the reflector, on its concave side and disposed on a circular arc centered about the focal point of the reflector. This arcuate rod is slidably received in openings of the post and is self-locking in any setting, the focal point of the reflector always remaining coincident with a plate at the top of the post for supporting an object to be heated.

8 Claims, 8 Drawing Figures

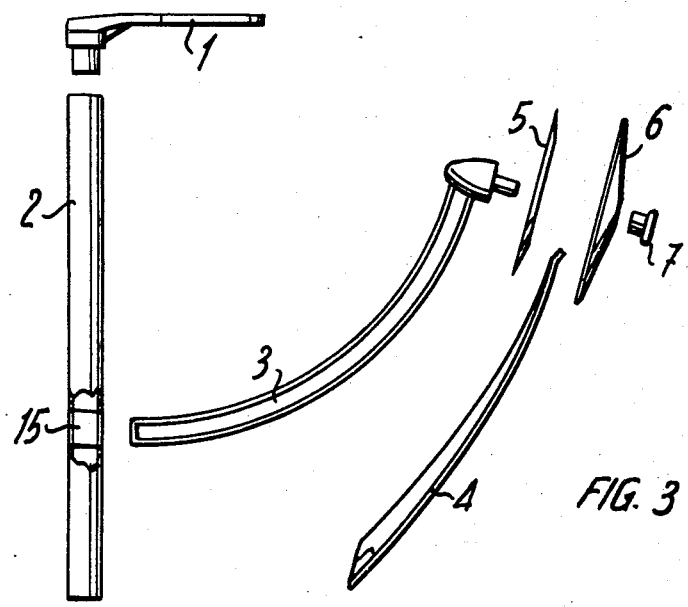
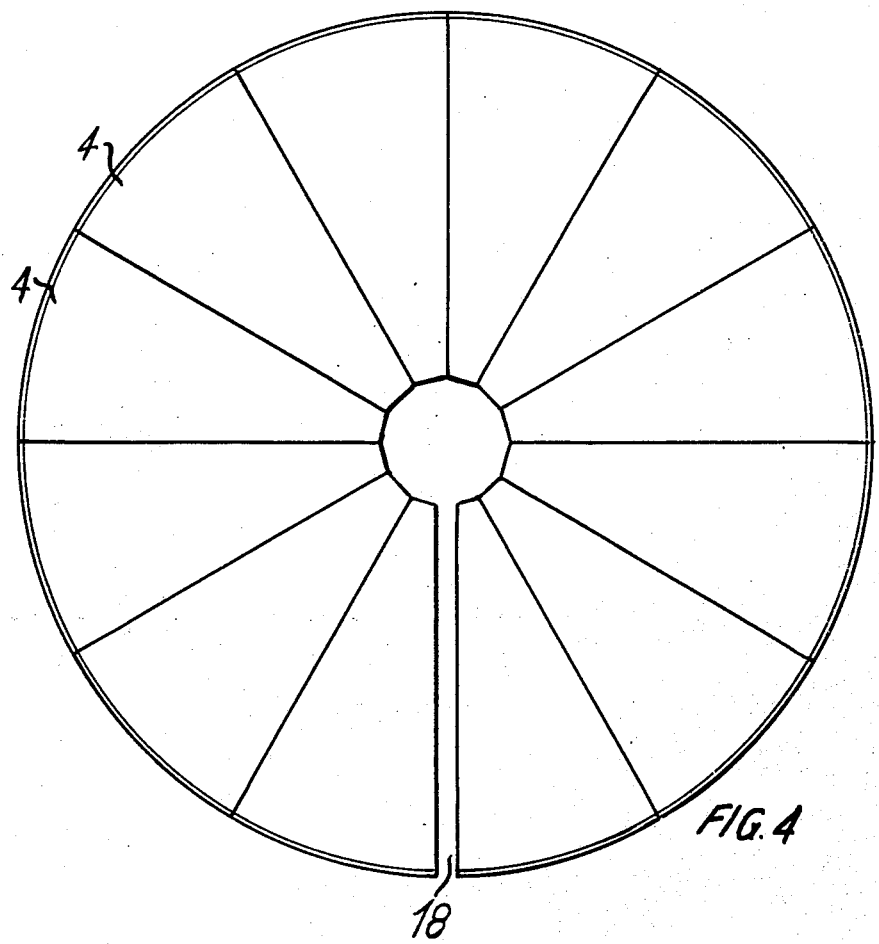

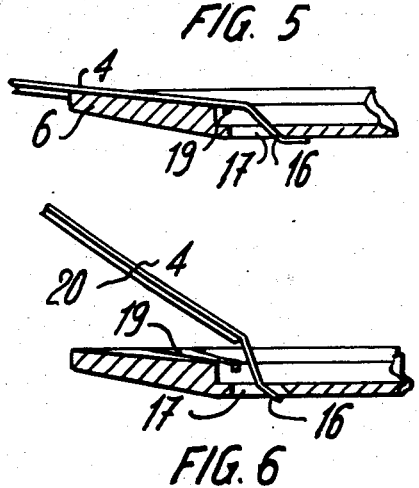
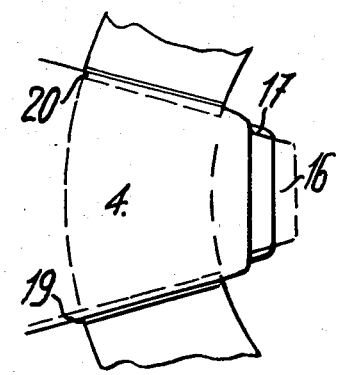
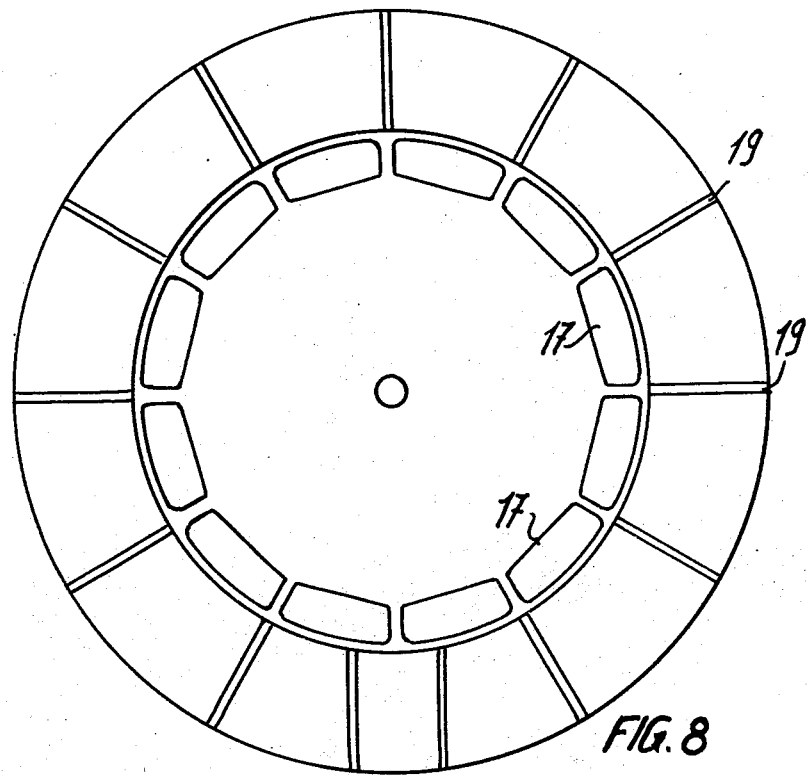

SOLAR-RAY HEATING APPARATUS

The invention relates to solar ray heating apparatus of the type comprising a support for an object to be heated and a concave reflector for converging the sun's rays onto the object.

In such known apparatus, the concave reflector is pivoted at or near its center on a support. Thus, as the reflector is pivoted, its focal point is displaced.

It is known that to obtain a good thermic output with these apparatus, the object to be heated should always be placed substantially at the focal point of the reflector. For this purpose, various devices and expedients have been proposed for moving the object when the orientation of the reflector is changed, so as to bring it back to the focal point.

An object of the invention is to provide a solar ray heating apparatus the setting of which is simplified and involves only a setting of the reflector, the object to be heated remaining located at the focal point of the reflector for all settings.

According to the invention, a solar-ray heating apparatus comprises a support for an object to be heated, a concave reflector for converging the sun's rays to a focal point, and means connecting the reflector for movement relative to the support to enable orientation of the reflector relative to the sun, said connecting means allowing movement of the reflector only between positions in which said focal point remains substantially coincident with a location on said support for an object to be heated.

The accompanying drawings show, schematically and by way of example, an embodiment of solar-ray heating apparatus according to the invention. In the drawings:

FIG. 3 is an exploded view of main parts of the apparatus;

FIG. 4 is a plan view of the reflector;

FIGS. 5, 6 and 7 show the assembly of a blade of the reflector and a supporting disc; and FIG. 8 is a plan view of the blade-supporting disc of FIGS. 5 and 7.

Figure 1:
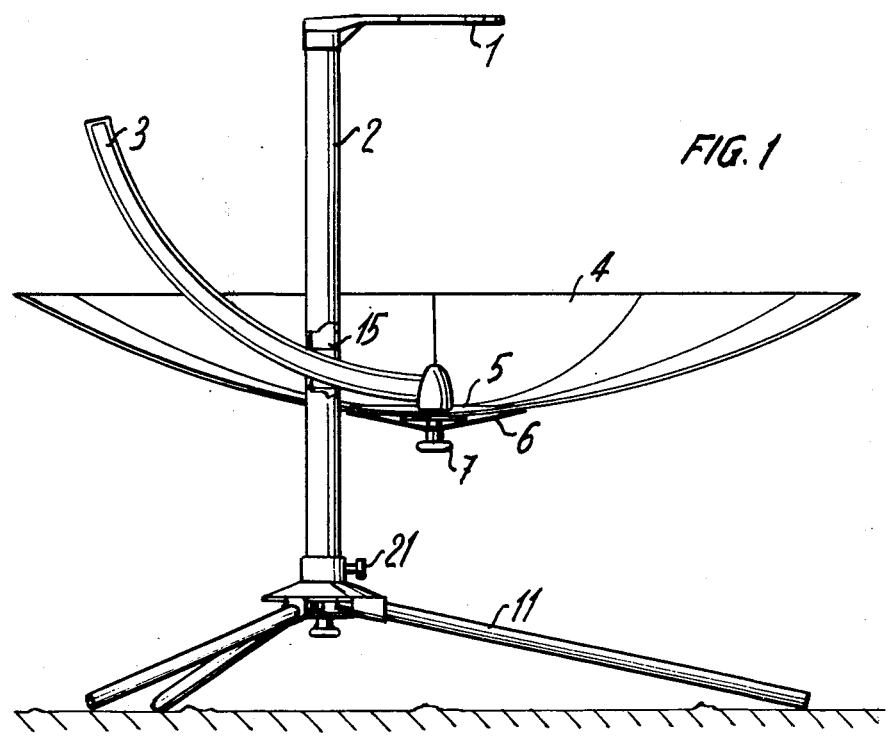
FIG. 1 is an elevational view, partly in vertical cross-section, of the apparatus, with the reflector in one position.
Figure 2:
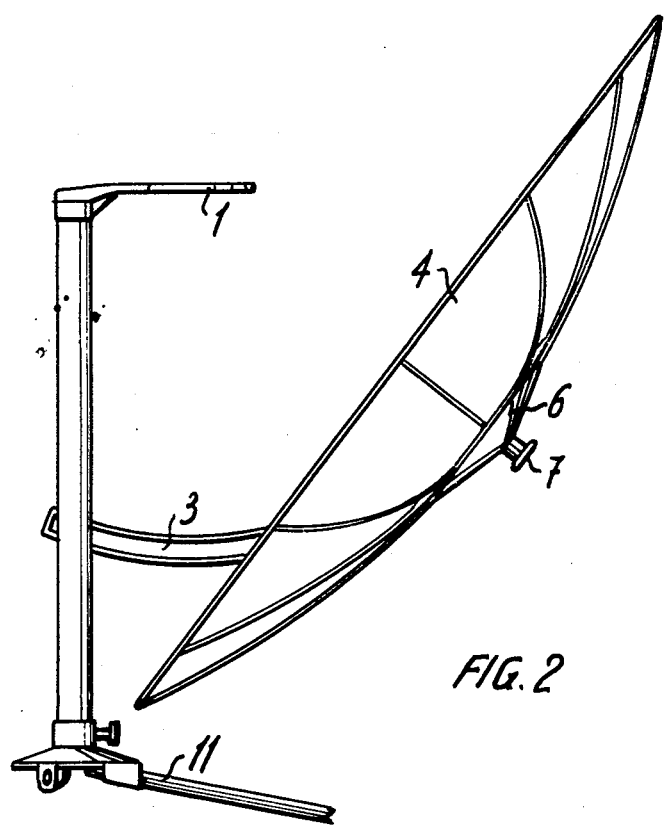
FIG. 2 is an elevational view of the apparatus with the reflector in another position.

The illustrated apparatus comprises a concave reflector formed of twelve blades 4 secured between two discs 5 and 6 disposed at the center of the reflector and held together by a screw 7. The disc 6 has a series of openings 17 (FIGS. 5 to 8) disposed in circular configuration concentric to the center of this disc. There are twelve openings 17, i.e. the same number as the number of blades 4. Each blade 4 has at its narrow inner end a bent tab 16 which engages in an opening 17 to hold the blade on disc 6 in a given angular position relative to the other blades.

Referring to FIGS. 6 and 7, the blades 4 have ribs 20 along each of their main edges which serve to make the blades sufficiently rigid and, by engaging in corresponding radial slots 19 provided in the disc 6, also precisely fix the orientation of the blades on the disc 6.

Two of the twelve blades 4 have a slightly different shape to the others, to provide between them a radial slot 18 as shown in FIG. 4.

An arcuate rod 3 is fixed to the central part of the reflector by means of the screw 7, and is disposed on the concave side of the reflector along a circular arc centered about the focal point of the reflector, and in alignment with the slot 18.

The apparatus also comprises a support formed of a tripod 11 and a rigid tubular post 2 of rectangular section which is disposed vertically and is pivotally mounted on the tripod 11 about its vertical axis.

A plate 1 for carrying an object to be heated is fixed at the upper end of the post 2. In its opposite faces, the post 2 has openings 15 through which the arcuate rod 3 passes. The openings 15 are spaced apart from the plate 1 so that when the rod 3 is engaged in the openings 15 of post 2, the plate 1 is located substantially at the focal point of the reflector. The radial slot 18 of the reflector is wide enough to allow passage of the post 2.

It is hence possible to vary the angle of the optical axis of the reflector in a vertical plane by sliding the arcuate rod 3 in the openings 15. This sliding is facilitated by slightly lifting up the reflector; when the reflector is in the desired position, its weight acts as a cantilever and jams the rod 3 in the openings 15 of post 2 to prevent unwanted sliding of the arcuate rod 3. Thus, the reflector can be set as a function of the height of the sun above the horizon.

Also, the post 2 can be pivoted about its vertical axis to set the reflector facing the sun, and fixed in a desired position by means of a knurled screw 21.

Since the curvature of the rod 3 is centered about the focal point of the reflector, it is easy to set or modify the setting of the reflector in relation to the sun without it being necessary each time to determine the location of the focal point in order to displace the object to be heated, and without having to move the entire apparatus.

This ease of handling facilitates use for domestic purposes while enabling industrial applications such as the fusion of metals.

The blades of the reflector are made of any suitable reflecting material of adequate strength, e.g. polished aluminum, either uncoated or anodised for example with a gold color.

Instead of openings 17, the tubular post 2 or other upright could have other means for guiding the arcuate rod 3 for longitudinal sliding movement.

I claim:

1. A solar-ray heating apparatus comprising a support, said support including a vertically extending post, means fixed on the upper part of the post and carrying an object to be heated, a concave reflector for converging the sun's rays to a focal point, and means mounted on said post and connected to the reflector for movement of the reflector relative to the post to enable orientation of the reflector relative to the sun, said connecting means allowing movement of the reflector only between positions in which said focal point remains substantially coincident with a location on said means at the upper part of the post for carrying an object to be heated.

2. A solar-ray heating apparatus comprising a support for an object to be heated, a concave reflector for converging the sun's rays to a focal point, and means connecting the reflector for movement relative to the support to enable orientation of the reflector relative to the sun, said connecting means allowing movement of the reflector only between positions in which said focal point remains substantially coincident with a location on said support for an object to be heated, said support comprising a base for resting on the ground and an elongated upright extending vertically above said base, said upright being pivotally mounted on said base about a vertical axis, said connecting means comprising an arcuate rod fixed on the reflector and disposed on a circular arc centered about said focal point, and guide means on said upright for receiving said arcuate rod for longitudinal sliding movement in relation to said upright.

3. Apparatus according to claim 2, in which said arcuate rod is fixed to a central part of the reflector and disposed on the concave side thereof, the reflector having means defining at least one radial slot allowing passage of said vertical upright of the support.

4. Apparatus according to claim 3, in which said upright is a tube carrying at an upper end thereof means for supporting an object to be heated, said guide means comprising openings in said tube for slidably receiving the arcuate rod.

5. Apparatus according to claim 2, in which the reflector is formed of a series of reflecting blades connected together between two discs disposed at the center of the reflector, and at least one screw for gripping together said discs to retain said blades.

6. Apparatus according to claim 5, in which one of said discs has a series of openings disposed in circular configuration concentric to the center of said disc, each said blade having at one end a bent tab which engages in a respective opening in said disc.

7. Apparatus according to claim 5, in which each blade has a rib along each of its edges, one of said discs having means defining radial slots for receiving said ribs of the blades.

8. Apparatus according to claim 6, in which each blade has a rib along each of its side edges, one of said discs having means defining radial slots for receiving said ribs of the blades.

* * * * *